United States Patent
Blanpied et al.

(10) Patent No.: US 9,784,859 B2
(45) Date of Patent: Oct. 10, 2017

(54) CALIBRATING MODULAR CHARGED PARTICLE DETECTOR ARRAYS

(71) Applicant: Decision Sciences International Corporation, Poway, CA (US)

(72) Inventors: Gary Blanpied, Ramona, CA (US); Michael James Sossong, Ramona, CA (US); Shawn McKenney, Ramona, CA (US); Thomas Taylor, St. Johns, FL (US); Kolo Wamba, San Diego, CA (US)

(73) Assignee: Decision Sciences International Corporation, Poway, CA (US)

( * ) Notice: Subject to any disclaimer, the term of this patent is extended or adjusted under 35 U.S.C. 154(b) by 0 days.

(21) Appl. No.: 14/830,590

(22) Filed: Aug. 19, 2015

(65) Prior Publication Data
US 2016/0054458 A1    Feb. 25, 2016

Related U.S. Application Data

(60) Provisional application No. 62/039,253, filed on Aug. 19, 2014.

(51) Int. Cl.
| | | |
|---|---|---|
| *G01N 23/00* | (2006.01) | |
| *G01T 7/00* | (2006.01) | |
| *G01T 1/29* | (2006.01) | |
| *G01V 5/00* | (2006.01) | |

(52) U.S. Cl.
CPC ............ *G01T 7/005* (2013.01); *G01T 1/2935* (2013.01); *G01V 5/0016* (2013.01)

(58) Field of Classification Search
CPC .................................................. G01N 23/046
See application file for complete search history.

(56) References Cited

U.S. PATENT DOCUMENTS

| | | | | |
|---|---|---|---|---|
| 7,945,105 B1* | 5/2011 | Jaenisch | ............... | G01V 5/0008 382/128 |
| 8,604,440 B2* | 12/2013 | Frisch | ..................... | G01T 1/208 250/367 |
| 2011/0248163 A1* | 10/2011 | Morris | ................. | G01N 23/046 250/307 |

OTHER PUBLICATIONS

Bertolin, A., et al., "The RPC system of the OPERA experiment," Nuclear Instruments and Methods in Physics Research Section A: Accelerators, Spectrometers, Detectors and Associated Equipment, 602(3):631-634, May 2009.

(Continued)

*Primary Examiner* — Casey Bryant
(74) *Attorney, Agent, or Firm* — Perkins Coie LLP

(57) ABSTRACT

A charged particle detector array includes one or more pairs of super modules, one super module in a pair of super modules is positioned above a volume of interest (VOI), and the other super module in the pair of super modules is positioned below the VOI. This calibration technique first calibrates individual super modules in the one or more pairs of super modules while treating each super module being calibrated as a rigid body. Each super module in the one or more pairs of super modules further includes multiple vertically-stacked modules, and each module in the multiple vertically-stacked modules is composed of multiple layers of drift tubes. The calibration technique then calibrates individual modules in each of the super modules while treating each module being calibrated as a rigid body. Next, the calibration technique calibrates individual drift tubes in each layer of the modules.

16 Claims, 7 Drawing Sheets

(56) References Cited

OTHER PUBLICATIONS

Bhadra, S., et al., "The Design and Construction of the GDF Central Drift Tube Array," Nuclear Instruments and Methods in Physics Research A268, 268(1):92-104, May 1988.
Di Luise, S., "Systematic Study of the Calibration and Resolution of Drift Tubes for Muon Tracking in the ATLAS Experiment at the LHC," 2009 IEEE Nuclear Science Symposium Conference Record, Orlando, FL, USA, N16-1:1025-1027, Oct. 2009.
Gatz, H., "Calibration and Alignment of ALICE TRD Super Modules Using Cosmic Ray Data," Diplomarbeit von Henriette Gatz, Westfälische Wilhelms-Universität Münster Institut für Kernphysik, 30 pages, Sep. 2010.
International Search Report and Written Opinion dated Jan. 6, 2016 for International Application No. PCT/US2015/045955, filed on Aug. 19, 2015 (9 pages).

\* cited by examiner

| Geometry | Detector Efficiency (Tracks/s) | Geometric Mean Scattering Angle (mr) | Average Median Residual (cm) | Geometric Mean DoCA (cm) |
|---|---|---|---|---|
| Nominal | 6820 | 35.4 | 0.051 | 9.3 |
| Calibrated | 8507 | 11.7 | 0.031 | 1.4 |
| Percent improvement | 25% | 199% | 65% | 564% |

CALIBRATING MODULAR CHARGED PARTICLE DETECTOR ARRAYS

TECHNICAL FIELD

This patent document claims the benefit of priority of U.S. Provisional Patent Application No. 62/039,253, filed on Aug. 19, 2014. The entire contents of the before-mentioned patent application is incorporated by reference as part of the disclosure of this document.

TECHNICAL FIELD

The subject matter described in this disclosure generally relates to systems, devices, and processes that perform imaging and sensing based on cosmic-ray tomography.

BACKGROUND

Cosmic ray imaging and sensing are techniques which exploit the multiple Coulomb scattering of highly penetrating cosmic ray-produced muons to perform non-destructive inspection of the material without the use of artificial radiation. The Earth is continuously bombarded by energetic stable particles, mostly protons, coming from deep space. These particles interact with atoms in the upper atmosphere to produce showers of particles that include many short-lived pions which decay producing longer-lived muons. Muons interact with matter primarily through the Coulomb force having no nuclear interaction and radiating much less readily than electrons. Such cosmic ray-produced particles slowly lose energy through electromagnetic interactions. Consequently, many of the cosmic ray produced muons arrive at the Earth's surface as highly penetrating charged radiation. The muon flux at sea level is about 1 muon per $cm^2$ per minute.

As a muon moves through material, Coulomb scattering off of the charges of sub-atomic particles perturb its trajectory. The total deflection depends on several material properties, but the dominant effects are the atomic number, Z, of nuclei and the density of the material. The trajectories of muons are more strongly affected by materials that make good gamma ray shielding, such as lead and tungsten, and by special nuclear materials (SNM), such as uranium and plutonium, than by materials that make up more ordinary objects such as water, plastic, aluminum and steel. Each muon carries information about the objects that it has penetrated. The scattering of multiple muons can be measured and processed to probe the properties of these objects. A material with a high atomic number Z and a high density can be detected and identified when the material is located, inside low-Z and medium-Z matter.

Coulomb scattering from atomic nuclei in matter results in a very large number of small angle deflections of charged particles as they transit the matter. In some examples, a correlated distribution function can be used to approximately characterize the displacement and angle change of the trajectory that depends on the density and the atomic charge of the material. As an example, this distribution function can be approximated as a Gaussian distribution. The width of the distribution function is proportional to the inverse of the momentum of the particle and the square root of the real density of material measured in radiation lengths. The correlated distribution function of cosmic ray-produced muons can provide information on materials in the paths of the muons without using an active radiation source and proper detection of such cosmic ray-produced muons can be implemented in a way that is especially sensitive to selected materials to be detected.

SUMMARY

Techniques, systems, and devices are disclosed for calibrating (e.g., geometry of) a modular charged particle detector array in a top-down hierarchical procedure, and for calibrating charged particle momentum for a charged particle detector array, wherein the calibrated charged particle detector array is subsequently configured to perform imaging and sensing based on cosmic-ray tomography.

In one aspect, a technique for calibrating a modular charged particle detector array in a top-down hierarchical procedure is disclosed. This charged particle detector array includes one or more pairs of super modules, one super module in a pair of super modules is positioned above a volume of interest (VOI), and the other super module in the pair of super modules is positioned below the VOI. This calibration technique first calibrates individual super modules in the one or more pairs of super modules while treating each super module being calibrated as a rigid body. Each super module in the one or more pairs of super modules further includes multiple vertically-stacked modules, and each module in the multiple vertically-stacked modules is composed of multiple layers of drift tubes. The calibration technique then calibrates individual modules in each of the super modules while treating each module being calibrated as a rigid body. Next, the calibration technique calibrates individual drift tubes in each layer of drift tubes in the modules.

In another aspect, a technique for calibrating the geometry of a charged particle detector array is disclosed. This charged particle detector array includes one or more pairs of super modules, the upper super module in a pair of super modules is positioned above an empty volume of interest (VOI), and the lower super module in the pair of super modules is positioned below the empty VOI and directly facing the upper super module. During operation, the calibration technique identifies a first charged particle track using the upper super module positioned above the empty VOI. The calibration technique then identifies a second charged particle track using the lower super module positioned below the empty VOI, wherein the first and the second charged particle tracks are generated by the same charged particle. Next, the calibration technique generates one or more error parameters by comparing the first charged particle track and the second charged particle track. The calibration technique subsequently performs an iterative process to minimize the one or more error parameters by adjusting positions and orientations of either the upper super module relative to the lower super module or the lower super module relative to the upper super module.

In yet another aspect, a technique for calibrating charged particle momentum for a charged particle detector array is disclosed. This charged particle detector array includes one or more pairs of super modules, the upper super module in a pair of super modules is positioned above a volume of interest (VOI), and the lower super module in the pair of super modules is positioned below the VOI and directly facing the upper super module. During operation, the calibration technique positions a plate of known material property and known thickness inside the VOI, wherein the flat plate is substantially parallel to the super modules within the detector array. The calibration technique then measures scattering tracks of charged particles from the plate and compares the measured scattering tracks to an analytical model. The calibration technique generates a calibrated charged particle momentum curve based on the differences between the measured scattering tracks and the analytical model.

In another aspect, a modular charged particle detector array includes one or more pairs of super modules. One super module in a pair from the one or more pairs of super modules is positioned above a volume of interest (VOI), and the other super module in the pair is positioned below the VOI. Individual super modules in the one or more pairs of super modules can be calibrated. Each super module in the one or more pairs of super modules can include multiple vertically-stacked modules, and each module in the multiple vertically-stacked modules includes multiple layers of charged particle detectors from the modular charged particle detector array. Individual modules in each of the super modules can be calibrated. Individual charged particle detectors in each layer of charged particle detectors in the modules can be calibrated.

The charge particle detectors in the modular charged particle detector array can include drift tubes. Prior to calibrating individual super modules, one super module is identified as the reference super module among the one or more pairs of super modules. The reference super module can provide the coordinate reference frame for the other super modules within the one or more pairs of super modules. Identifying the reference super module can include identifying a corner on the reference super module as the origin of the coordinate reference frame and identifying an X-Y plane and a Z-axis of the reference super module as (X, Y, Z)-coordinates of the reference frame. After identifying the reference super module and prior to calibrating the modular charged particle detector array, degrees of freedom are specified for each of the other super modules within the one or more pairs of super modules with respect to the coordinate reference frame.

Specifying the degrees of freedom for each of the other super modules can include specifying positions of a given other super module based on a reference origin on the given other super module with respect to the origin of the reference frame; and specifying orientations of the other super module based on three Euler angles with respect to the (X, Y, Z)-coordinates of the reference frame.

Individual drift tubes can include drift tube segments. After identifying the reference super module and prior to calibrating the modular charged particle detector array, nominal positions and orientations can be specified for individual modules in each of the other super modules; individual drift tubes in each of the individual modules; and individual drift tube segments in each of the drift tubes in individual modules.

After calibrating the individual modules but prior to calibrating the individual drift tubes, individual layers of drift tubes in each of the modules in each of the super modules can be calibrated. The individual drift tubes can include drift tube segments. After calibrating the individual drift tubes in each layer of drift tubes in each of the modules, drift tube segments in each of the individual drift tubes can be calibrated.

While calibrating individual super modules, each super module being calibrated can be treated as a rigid body. Calibrating individual super modules can include predicting new values of the positions and orientations of a given super module; computing differences between previous values of the positions and orientations and the predicted new values; generating updated values for the positions and orientations by updating the previous values by a fraction of the computed differences between the previous values and the predicted new values; using the updated values for the positions and orientations to determine one or more error parameters; and repeating the predicting, computing, generating and using until the determined one or more error parameters satisfies one or more predetermined thresholds.

Calibrating the super module can include iterating to minimize the one or more error parameters. The one or more error parameters can include: a scattering angle between a first charged particle track generated by the upper super module in a pair of super modules and a second charged particle track generated by the lower super module in the pair of super modules. The first and the second charged particle tracks are generated by the same charged particle. A well-calibrated charged particle detector array is associated with a substantially zero scattering angle; and a distance of closest approach (DoCA) between the first charged particle track and second charged particle track. A perfectly aligned charged particle detector array is associated with a substantially zero DoCA.

While calibrating individual modules in each of the super modules, each module being calibrated can be treated as a rigid body. Calibrating a module in the individual modules can include reading offline data including a starting geometry of the module; performing an iterative calibration on the module based on charged particle track fitting; and modifying the starting geometry and storing the modified geometry in a file. The VOI can be an empty VOI.

In another aspect, a charged particle detector array is disclosed. The charged particle detector array can include one or more pairs of super modules. The upper super module in a pair of super modules is positioned above an empty volume of interest (VOI), and the lower super module in the pair of super modules is positioned below the empty VOI and directly facing the upper super module. The charged particle detector array can be configured to calibrate the geometry of the charged particle detector array including identifying a first charged particle track using the upper super module positioned above the empty VOI; identifying a second charged particle track using the lower super module positioned below the empty VOI, wherein the first and the second charged particle tracks are generated by the same charged particle; generating one or more error parameters by comparing the first charged particle track and the second charged particle track; and performing an iterative process to minimize the one or more error parameters by adjusting positions and orientations of either the upper super module relative to the lower super module or the lower super module relative to the upper super module.

The one or more error parameters can include the scattering angle between the first charged particle track and second charged particle track. A perfectly aligned charged particle detector array can be associated with a substantially zero scattering angle; and the distance of closest approach (DoCA) between the first charged particle track and second charged particle track. A perfectly aligned charged particle detector array is associated with a substantially zero DoCA.

Performing the iterative process to minimize the one or more error parameters can include predicting new values of the positions and orientations of the upper super module relative to the lower super module; computing differences between previous values of the positions and orientations of the upper super module and the predicted new values; generating updated values for the positions and orientations by updating the previous values by a fraction of the computed differences between the previous values and the predicted new values; and recomputing the one or more error parameters using the updated values for the positions and orientations. Each of the one or more the error parameters is a multi-dimensional vector, and each identified particle track is used to generate a separate component in a multi-dimensional vector. Each of the first and second charged particle tracks is a muon track.

In another aspect, a charged particle detector array configured to calibrate charged particle momentum in the charged particle detector array. The charged particle detector array includes one or more pairs of super modules. The upper super module in a pair of super modules is positioned above a volume of interest (VOI), and the lower super module in the pair of super modules is positioned below the VOI and directly facing the upper super module.

The charged particle detector array can be configured to calibrate the geometry of the charged particle detector array including positioning a plate of known material property and known thickness inside the VOI. The plate is substantially parallel to the super modules within the detector array. The charged particle detector array can be configured to calibrate the geometry of the charged particle detector array including measuring scattering tracks of charged particles from the plate; and comparing the measured scattering tracks to an analytical model. The charged particle detector array can be configured to calibrate the geometry of the charged particle detector array including generating a calibrated charged particle momentum curve based on the differences between the measured scattering tracks and the analytical model.

The calibration methods can be applied to a charged particle detection system.

BRIEF DESCRIPTION OF THE DRAWINGS

FIG. 6 shows the improvements from the detector calibration using the above-described modular calibration procedure on a "Freeport detector" in accordance with some embodiments described herein.

DETAILED DESCRIPTION

Figure 1A:
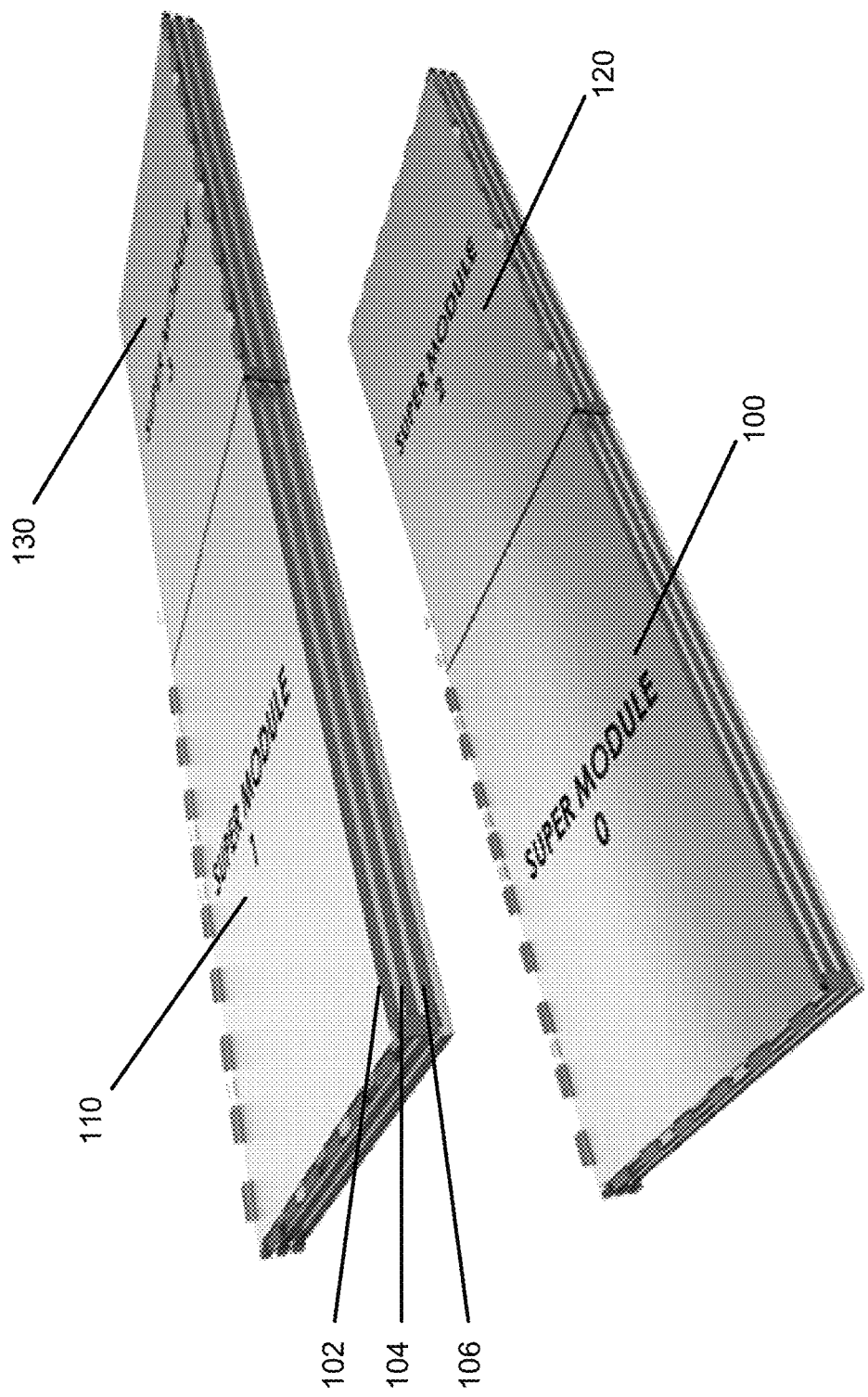
FIG. 1A shows an exemplary charged particle detector array comprising two pairs of super modules (SMs), each of which further comprises three vertically stacked modules in accordance with some embodiments described herein.

In some examples of cosmic ray imaging and sensing, a muon tomography system can be configured to perform tomography of a target object under inspection based on scattering of muons by the target object. For example, muon tomography systems can be used for detecting certain targeted objects, e.g., such as materials that can be used to threaten the public, including smuggled nuclear materials. Muon tomography detector systems can be used jointly with or an alternative to other nuclear material detectors such as gamma or X-ray detectors. Gamma and X-ray detectors operate by directing Gamma and X-ray radiation to a target and measuring penetrated Gamma and X-ray radiation. Shielding of nuclear materials can reduce the count rates in the Gamma and X-ray detectors and reduce the detection performance of Gamma and X-ray detectors. Muon tomography detection systems can be configured to detect shielded nuclear materials and objects.

In an example of a muon tomography detection system, the muon detectors can include an array of drift-tube sensors configured to enable tomographic imaging of a volume of interest (VOI) using ambient cosmic rays as the illuminating radiation source. Cosmic ray charged particles, e.g., primarily muons and electrons, shower through the VOI, and measurement of individual particle tracks can be used to reconstruct the three-dimensional distribution of atomic number (Z) and density of materials in the VOI using particle scattering.

Disclosed are techniques, systems, and devices for calibrating (e.g., geometry of) a modular charged particle detector array in a top-down hierarchical procedure, and for calibrating charged particle momentum for a charged particle detector array, wherein the calibrated charged particle detector array is subsequently configured to perform imaging and sensing based on cosmic-ray tomography.

Because the detection and/or imaging techniques performed by the disclosed cosmic-ray particles detection systems are entirely passive, e.g., relying on natural, ambient cosmic-ray particles and on natural emission of gamma rays and/or induced emission of neutrons from materials of the target object, the disclosed system can be referred to as a Multi-Mode Passive Detection System (MMPDS).

In implementing muon tomography based on cosmic-ray particles, it is desirable to have a detector assembly be well-calibrated for particle momentum and system geometry to achieve sufficient charged particle detector efficiency and provide accurate reconstruction of particle trajectories of the muons entering the object under detection. The charged particle detector array can be quite large in some muon tomography imaging applications such as portal monitoring systems or vehicle inspection systems in which the location and orientation of detector elements may be significantly different from their nominal values. This is partially because the dimensional tolerances become difficult to maintain over a large structure without incurring large increases in the cost of construction and assembly. The disclosed technology can be used to provide a practical technique that uses signals from the natural cosmic-ray muon background radiation passing through an empty volume of interest (VOI) or a "target volume" to calibrate the momentum distribution and calculate the actual positions and orientations of the entire set of drift tube detector elements in the array.

One way of performing muon detector calibration involves surveying the detector positions and orientations with high accuracy, often achieved by using physical position measurement tools. However, this technique tends to require line-of-sight access to the detectors in the system and can be labor intensive. Fabrication and assembly of detector arrays with extremely tight physical tolerances can be technically challenging and, in addition, can significantly increase the overall costs for commercial uses. The disclosed technology provide a practical calibration technique to meet those challenges while maintaining the overall detector array cost at a reasonable level.

The disclosed technology provides a way for calibrating drift-tube detector arrays designed for ambient radiation by treating all the tubes in the detector array as an assemble of detector tubes and by taking into account the effects of long range order among the detector tubes. This aspect of the disclosed technology avoids treating different detector tubes as independent entities without considering any long range order which can make the calibration procedure cumbersome and time-consuming to perform, and can also increase the possibility of incorrect solutions (e.g., local minima). In one aspect, for example, the disclosed technology for detector array calibration incorporates a hierarchical modularity in detector array construction into the calibration procedure, thereby improving both calibration robustness and processing efficiency.

The implementation of the hierarchically modular design of the MMPDS detector array can be used to enable an automated and efficient process for iteratively and hierarchically calibrating the detector array. In particular embodiments, detector array calibration is first performed at the level of super-modules (SM), where each SM is a collection of individual modules. The total number of modules within a SM can vary. A module within the SM includes any number of sensors, such as drift tube sensors. The calibration is then performed at the level of individual modules, next at the level of individual drift tube sensors in a module, and finally at the level of individual tube segments within a drift tube.

Figure 1B:
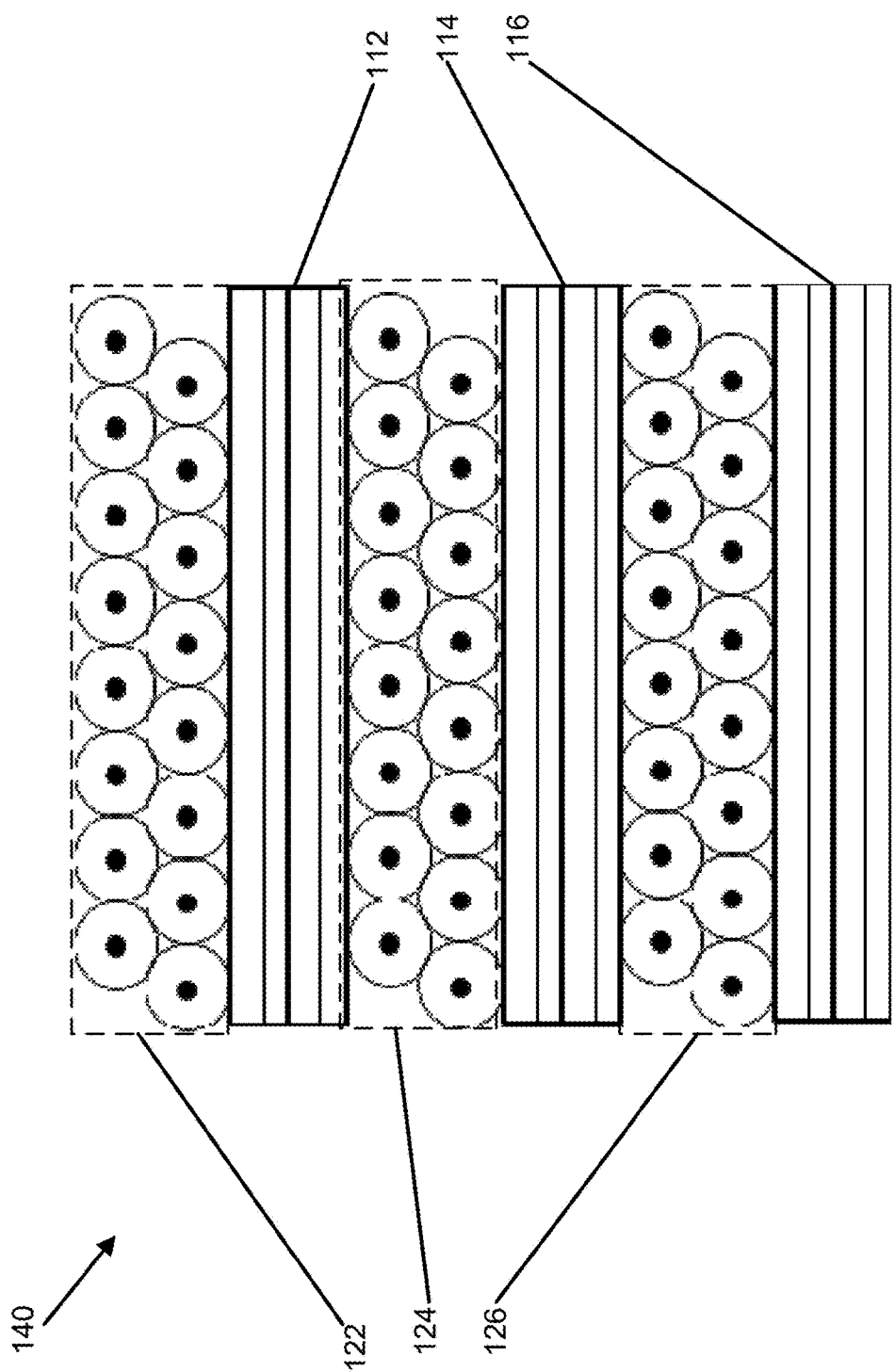
FIG. 1B illustrates an exemplary SM.

FIGS. 1A and 1B are diagrams illustrating exemplary groups of modules (super modules) of drift tube sensors for a MMPDS. FIG. 1A shows four exemplary super modules (SMs) 100, 110, 120, and 130. FIG. 1B shows an exemplary SM 140 with each module layers 102, 104, 106, 112, 114, 116 arranged along two directions. SM 140 can be substantially similar to SMs 100, 110, 120, and 130. In some implementations, the MMPDS "Super-Module" (SM) 100, 110, 120, 130, or 140 is a collection of modules arrayed in six layers, alternating between x-(24-ft) and y-(36-ft) facing modules with each layer (FIG. 1B). In one example, each SM 140 shown in FIG. 1B includes 90 modules, of which 54 are x-facing 122, 124, 126, and 36 are y-facing 112, 114, and 116. Thus each x layer has 18 modules and each y layer has 12 modules. The SMs are paired such that one is suspended above a target and one is below in order to track particles that pass through the target volume. FIG. 1B illustrates an exemplary SM 140, which is substantially similar to the four SMs 100, 110, 130, or 130 in FIG. 1A. As shown in FIG. 1B, each SM comprises six sets of modules, stacked alternatively in x (in and out of page) 122, 124, 126 and y (left to right) 112, 114, 116 directions. Each module comprises 24 drift tubes, stacked as two layers of 12 tubes each with the layers offset by a tube radius. Each x module set 122, 124, 126 comprises 18 modules and each y module set comprises 12 modules positioned beside each other on a common axis that is perpendicular to the length of the drift tubes. An MMPDS detector comprises pairs of SMs, positioned above and below a target volume.

The orientations of an MMPDS detector such as the one shown in FIG. 1A may be specified according to pitch, roll and yaw angles. In some embodiments, instead of specifying orientations of the detector modules by pitch, roll and yaw angles, the proposed calibration technique uses Euler angles to specify system orientations, thus avoiding both singularities in the coordinate system and local minima in the solution space that might otherwise yield erroneous calibrations.

In some embodiments, the propose calibration technique performs an iterative optimization (i.e., to search for the global minimum of the residual error) adiabatically. More specifically, each successive iteration uses position and orientation values changed by one-tenth the values predicted by the last iteration. Although this technique may increase the number of iterations in the calibration procedure, it has the advantage of avoiding finding local minima and increasing the likelihood that the calibration procedure generates a robust, reliable result.

In some embodiments, the module calibration is performed by excluding the drift tubes in the module of that layer from participating in the determination of the track and then calculating and storing to a histogram the residuals of the tubes in each module in that layer.

In these embodiments, each module has two histograms in which the residuals for the first or the second segment of all tubes in a module are entered. After a specified number of epochs have been processed, the median of each histogram is determined and a fit to these two values, along with the known length of the drift tubes, specifies the amount of horizontal shift and rotation of each module in that XY layer.

In these embodiments, for the drift tube calibration, two histograms for each tube are generated, corresponding to the two segments. For the drift tube segment calibration, each segment is divided in half and put in one of two histograms. The design with two histograms, representing one-half of the length of the geometry item, allows the extraction of a horizontal shift and angular rotation, based on the shift in the residuals for that item.

The detectors used in the MMPDS includes arrays of drift tubes as particle detector elements that are aligned in orthogonal X and Y directions above and below an interrogation volume. These drift tubes are organized into nested elements starting with the super-module (SM), which is constructed out of alternating X and Y layers of modules. In some implementations, the SMs are configured in pairs, and for a give pair of SM, one pair is positioned directly below an inspection VOI (referred to as the "lower SM") and the other pair is positioned directly above the VOI (referred to as the "upper SM").

FIG. 1A shows an example of a charged particle detector array that includes two pairs of SMs: the first pair of a lower module SM0 (100) of drift tubes and a corresponding, aligned upper module SM1 (110) of drift tubes and a second pair of a lower module SM2 (120) of drift tubes and a corresponding, aligned upper module SM3 (130) of drift tubes. The two pairs are placed side by side as shown to collectively provide a larger inspection VOI between the upper modules SM1 (110) and SM3 (130) and the lower modules SM0 (100) and SM2 (110). Each of the modules SM0-SM3 includes vertically stacked modules, e.g., three or more vertically stacked modules to obtain measurements at three or more different vertical positions. More specifically, the SMs are paired such that for each SM that is suspended above a target volume, there is a corresponding SM below the target volume to track muons (and other charged particles, such as electrons) that pass through the target volume. In one example, each SM is 24 feet wide (in X) by 36 feet long (in Y). Detectors for inspecting large objects, such as semi-trucks, may have two pairs of SMs adjacent to each other along the Y axis as shown in FIG. 1A, thereby allowing scanning the entire truck in a single time interval, in a single image. However, a charged particle detector array can include fewer or more SM pairs than the one shown in FIG. 1A. Furthermore, pairs of SMs can be arranged in different ways to meet different target interrogation volume requirements.

In the example of FIG. 1A, each SM (SM0-SM3) further comprises three stacked multi-layer modules (e.g., SM1 comprises three modules 102, 104, and 106 in three stacked-layers). Each module is a composite unit comprised of alternating X and Y layers of drift tubes. In one exemplary system, one detector module includes a set of drift tubes (e.g., 24) arranged side by side in two layers, with one layer above the other and offset by one tube radius from the other. During operation, a detector module senses particle tracks and localizes them along the axis orthogonal to the cylindrical axis of the tubes. Hence, two detector modules with tubes orthogonal to each other can provide localization information along two axes, denoted as "X" and "Y," in the plane of the tubes. In one exemplary system, the modules are either 24-ft or 36-ft in nominal length. The 24-ft module is composed of pairs of 12-ft drift tubes that are placed in series, whereas the 36-ft module is composed of pairs of 18-ft drift tubes that are placed in series.

Figure 2:
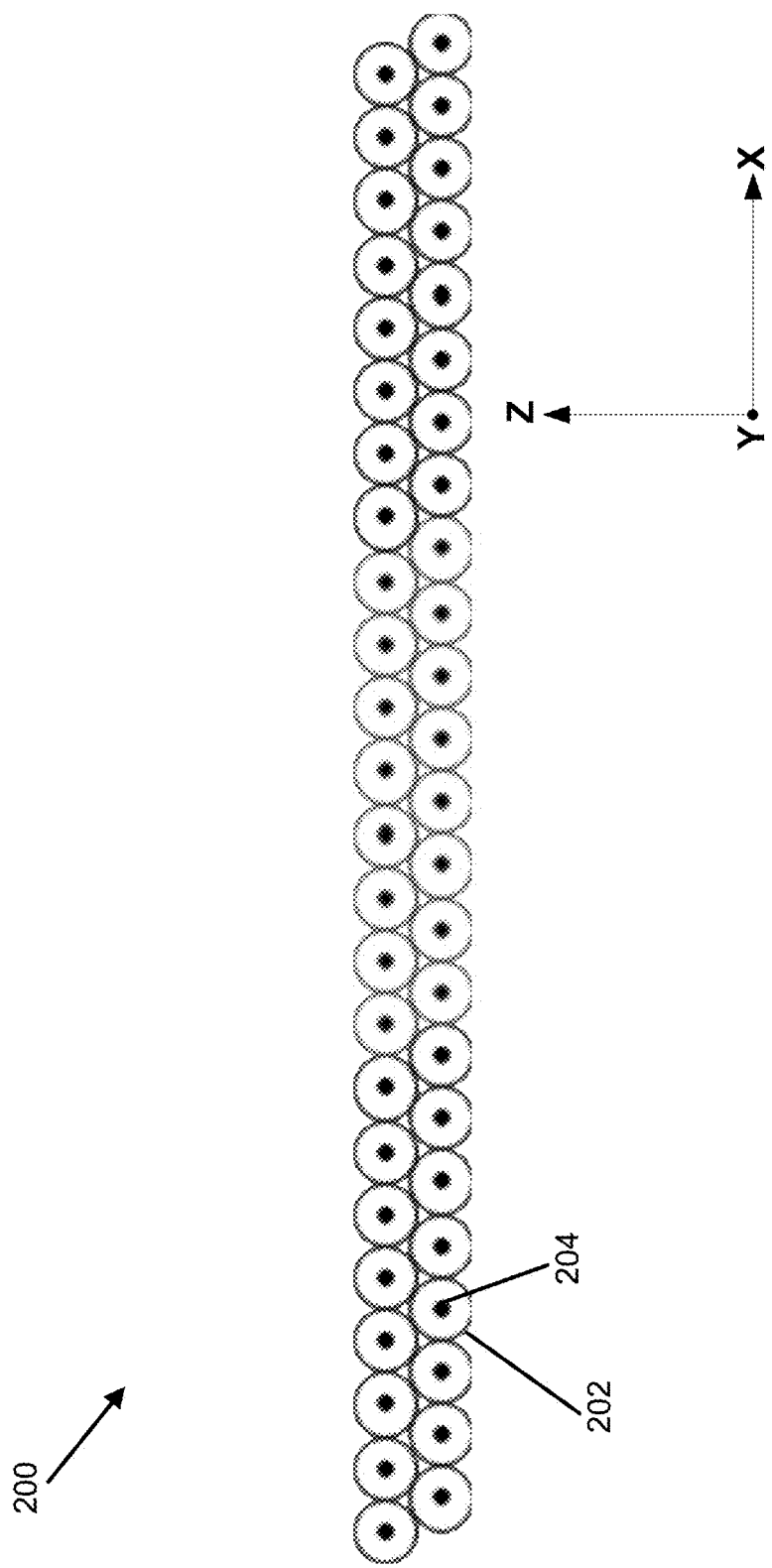
FIG. 2 shows an exemplary module in the charged particle detector array which comprises XY layers of drift tubes in accordance with some embodiments described herein.

FIG. 2 shows an exemplary module 200 in the charged particle detector array which comprises XY layers of drift tubes in accordance with some embodiments described herein. Note that not all drift tubes and modules are shown in this figure. In the example shown, a single X layer of the module includes two layers of 24 drift tubes that are placed side-by-side to each other in the X-direction in succession. For example, the large circles 202 in the figure represent the aluminum tube cathode; the small dark circles 204 represent the anode. The layers are laterally offset from each other by a tube radius. Similarly, the Y layer (not shown) can include a set of drift tubes (e.g., 12 of them) that are placed side-by-side to each other in the Y-direction (into the paper plane). In this example, each of the X and Y layers is comprised of two rows of drift tubes.

In some implementations, a module is a set of 24 factory-built drift-tube channels which are grouped together and mated with a set of electronics. A drift-tube channel is a single signal lane, comprising one or more drift tubes connected in series. The drift-tube channel is connected to a single electronics input. This set of electronics provides the necessary voltage bias between the cathode and anode of each drift tube and senses the output signal from each drift tube. The module is then tested as a unit and shipped as a building block of the larger detector.

Geometry Calibration

Generally, the detection function of the MMPDS is achieved by detecting cosmic ray muons passing through the upper SM, through the VOI, and through the lower SM. In one implementation, the detection technique relies on identifying individual incident muon particles that have observed to pass through both upper and lower SMs and calculating the scattering angle of each particle's path through material within the VOI. It is generally desirable to detect as many of the incident particles as possible for the purposes of higher detection efficiency and shorter scan time. It is also important to obtain accurate scattering angle measurements for the purpose of reconstructing the material properties in the VOI and thus accurately detecting materials of interest.

Because these cosmic ray muons travel at speeds near the speed of light, the spread in time of the drift tubes from one muon track is typically dominated by the drift time and the propagation time down the tube to the electronics, while the time of flight correction is not a significant factor. Analysis can be used to pair up detections in the upper and lower SM's into the most likely particle trajectories.

Note that errors in the estimation of positions and orientations of the drift tubes in the detector array can have multiple consequences. First, single-muon trajectories that are detected may be mis-assigned because trajectory estimates from the upper and lower SM's may become erroneous and fail to appear as originating from a single particle. This error reduces the number of trajectories detected per unit time and increases the time required to obtain a robust image. Second, the trajectories that are detected can yield erroneous spatial trajectories, leading to errors in the reconstructed spatial distribution of material properties. This problem can reduce probability of detection and/or increase probability of false alarms. These undesirable consequences are the reasons that the nominal detector geometry needs to be adjusted through a calibration process. Various geometry calibration techniques are described this patent disclosure.

In some implementations, a charged particle detector array detector geometry calibration is designed to minimize one or more of the following parameters: the scattering angle, the distance of closest approach (DoCA), and the number of points of closest approach (PoCA) of muons passing through an empty volume of interest (VOI).

More specifically, a geometry calibration technique detects muons that travel through an empty VOI. These muons experience statistically negligible scattering as they travel through air (which is both low-density and of low atomic number "Z"). Each of the upper SM and the lower SM can be used to project linear trajectories for a given muon. Ideally, a detector array having perfectly placed drift tubes in the nominal geometry would generate straight-line trajectories of muons with a small systematic error, and trajectories of the upper and lower arrays would match most of the time. In reality, geometry construction errors cause departures in tube positions and orientations from the ideals which increase the errors in trajectory estimates. In one implementation, up to one hour of muon data traveling through an empty VOI is collected and processed for the purpose of calibration.

Using the collected data, a proposed detection and processing technique generates track fits by assuming a straight line trajectory of the detected particle through a given SM and by minimizing a measure of the residual errors (i.e., the difference between the computed and measured track location at each detector), referred to as "L1 norm." The L1 norm is a measure of vector length obtained by summing the absolute value of each vector component, as opposed to the "L2 norm," which is the square root of the sum of the squares of the errors in the components. Note that L1 norm minimization is used over the L2 norm minimization because the former can be more robust for use in detectors that do not distinguish between the side of the detector through which the particle passed, such as drift tubes.

In some implementation, prior to the calibration, each SM is leveled as much as possible. One SM, designated as SM0, is defined to be level to provide the coordinate reference frame and all measurements are related to its origin (0, 0, 0). For example, one corner of the SM0 can be used as the reference origin (0,0,0) of the (X, Y, Z) coordinates, and the X-Y plane and the Z axis of SM0 become the references of the nominal orientations. The degrees of freedom of the other SMs may then be specified by the position of the respective origins with respect to SM0 and the respective orientations. Orientations may be defined using three proper Euler angles: the angle that describes rotation around the reference Z axis, then the angle that describes rotation around the new X' axis, and finally the angle around the new Z' axis. Next, a geometry builder program specifies the nominal (i.e., ideal) positions and orientations for: (1) the SMs in the detector, (2) the modules in each SM, (3) the drift tubes and (4) tube segments in each module. Note that the use of Euler angles instead of, for instance, polar coordinates or roll, pitch and yaw angles can help to avoid mathematical singularities and instabilities in the error minimization.

Figure 3:
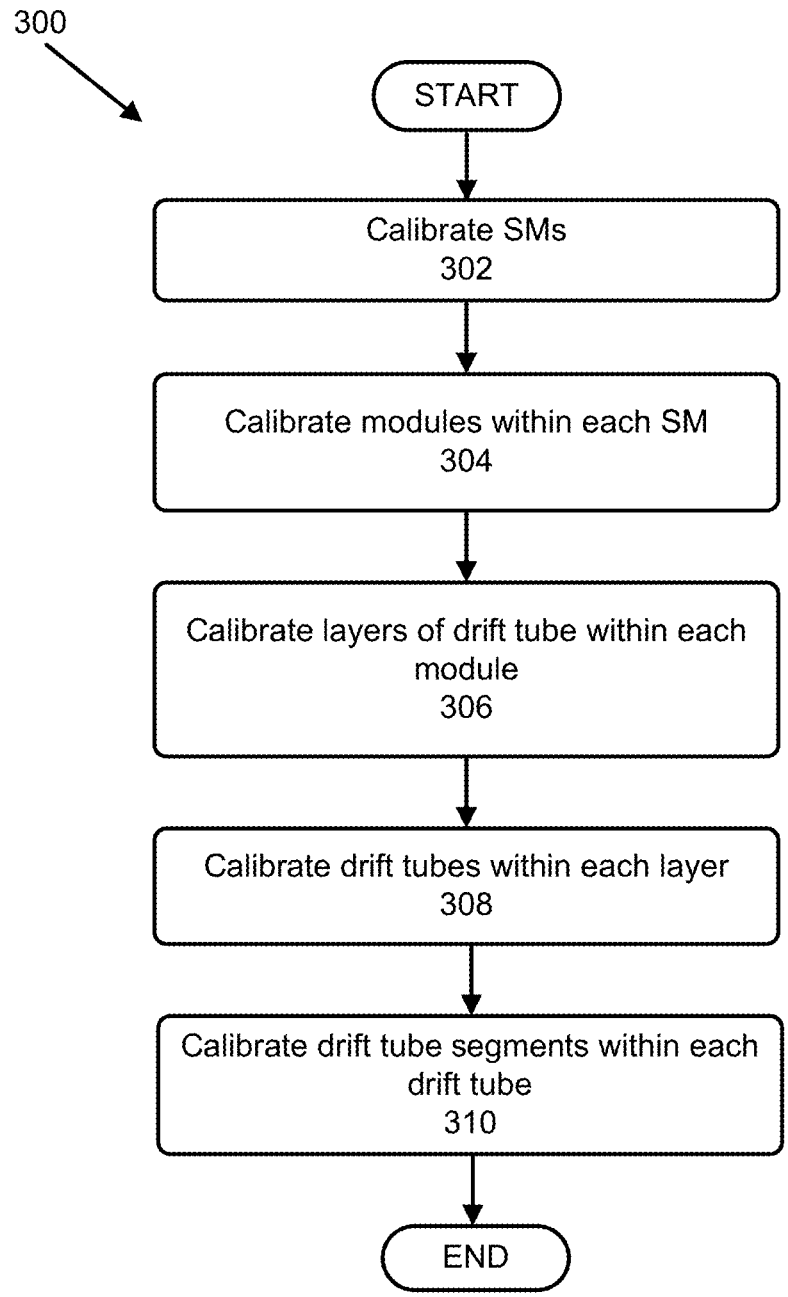
FIG. 3 illustrates a top-down hierarchical calibration procedure which involves multiple levels of calibration in accordance with some embodiments described herein.

A proposed geometry calibration process is a hierarchical calibration procedure based on the hierarchical modularization of the detector array. FIG. 3 illustrates a top-down hierarchical calibration procedure 300 which involves multiple levels of calibration in accordance with some embodiments described herein. More specifically, first level of calibration is at the SMs level which form the detector system (302), then next level of calibration calibrates the modules which form each SM (304). The next level of calibration calibrates layers of drift tubes which form a given module (306). The next level of calibration then calibrates drift tubes which form a layer (308), and the final level of calibration calibrates tube segments of a given drift tube (310). We now describe this hierarchical calibration procedure in detail. In some implementations, each of the multiple levels of calibrations is a geometry calibration.

At the highest level, each SM is calibrated. For example, in the exemplary detector array of FIG. 1A, each of SM1, SM2 and SM3 is calibrated wherein SM0 is the reference SM. During calibration, each SM can be treated as a rigid body with all its detectors (including modules, drift tube layers, drift tubes and drift tube segments) considered as ideally positioned within the given SM. In one implementation, to calibration the SM directly above SM0, referred to as "SM1," two muon tracks may be identified: one by SM0 and the other by SM1, wherein the two muon tracks are generated by the same muon. The two tracks are then compared and two "error parameters" are generated: (1) the scattering angle of the tracks; and (2) the distance of closest approach (DoCA) between the two tracks. Ideally, a detector array having perfectly placed drift tubes in the nominal geometry would generate zero scattering angle and zero DoCA. However, the computed error parameters are typically nonzero initially partially because of the actual detector geometry that includes misalignments. An iterative process then involves adjusting the positions and orientations of the SM1 relative to SM0 and subsequently recomputing the error parameters with the objective to minimize these error parameters. Note that each of the error parameters is a multi-dimensional vector. In some embodiments, each identified particle track is used to generate a separate component in a multi-dimensional vector.

Figure 4:
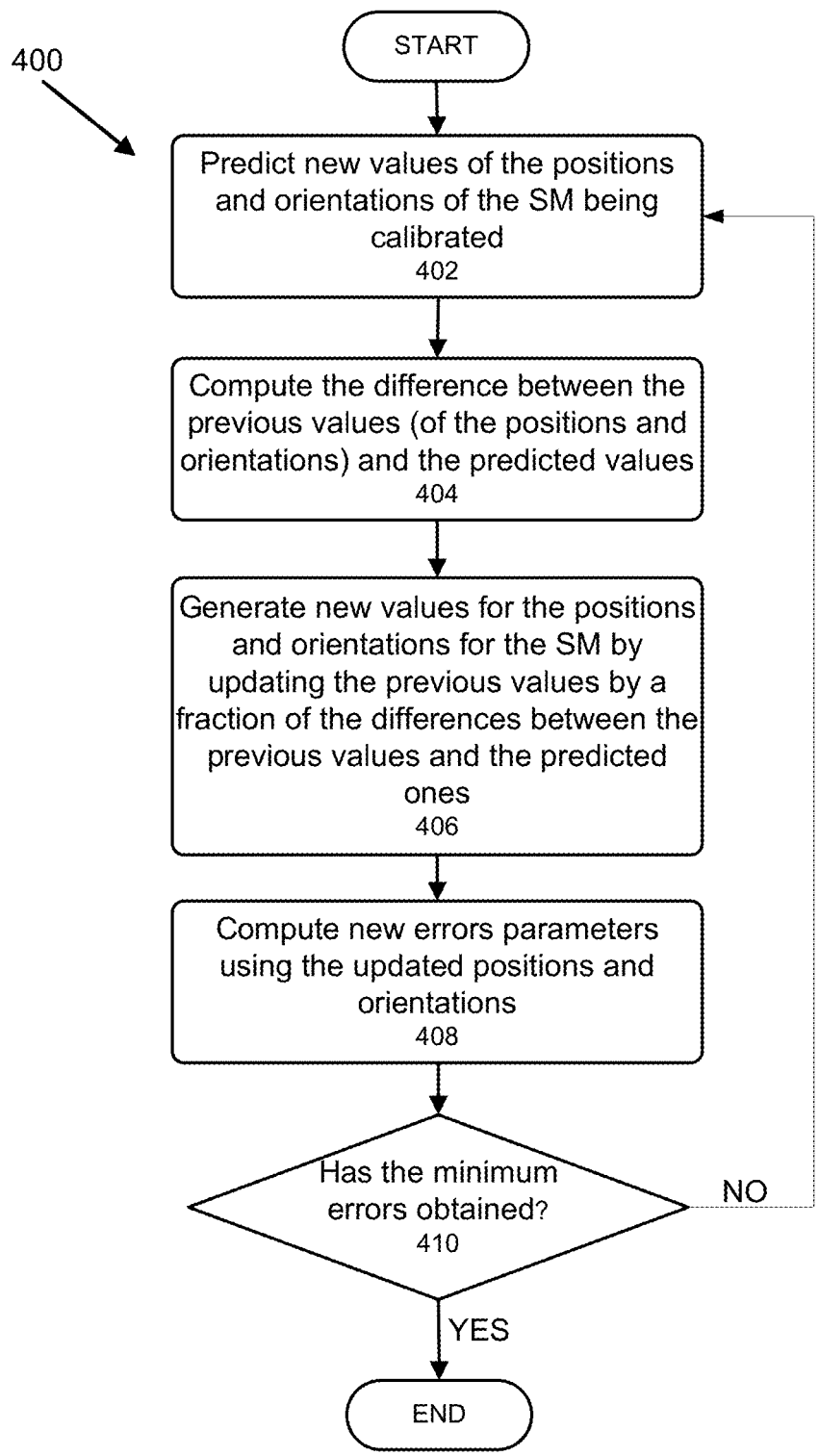
FIG. 4 presents a flowchart illustrating an iteration process of adiabatically calibrating a SM in accordance with some embodiments described herein.

In some implementations, the iteration process is performed adiabatically. FIG. 4 presents a flowchart illustrating the iteration process 400 of adiabatically calibrating a SM in accordance with some embodiments described herein. More specifically, in each iteration, the regression program predicts new values of the positions and orientations (i.e., the Euler angles) of the SM being calibrated (step 402). Next, the program computes the differences between the previous values (of the positions and orientations) and the predicted values (step 404). The program then greneartes new values for the positions and Euler angles for the SM being calibrated by updating the previous values by only a fraction of (e.g., one-tenth) the differences between the previous values and the predicted ones (step 406). The program then computes new error parameters using the updated positions and orientations (step 408) and subsequently determines if the minimum errors are obtained, for example, when a change in L1 norm is less than an operator-specified value (step 410). The iteration process continues adiabatically until the minimum errors are obtained. Note that this technique mitigates the possibility that the program might not find the true minimum in the L1 norm of the error vector by making too large a change in assumed orientation and "jumping over" the minimum, and eventually settling in a local minimum with a larger value of the error vector norm. In one embodiment, the above described adiabatic error minimization steps are performed off-line, e.g., using MATLAB® (The MathWorks, Inc.).

Figure 5:
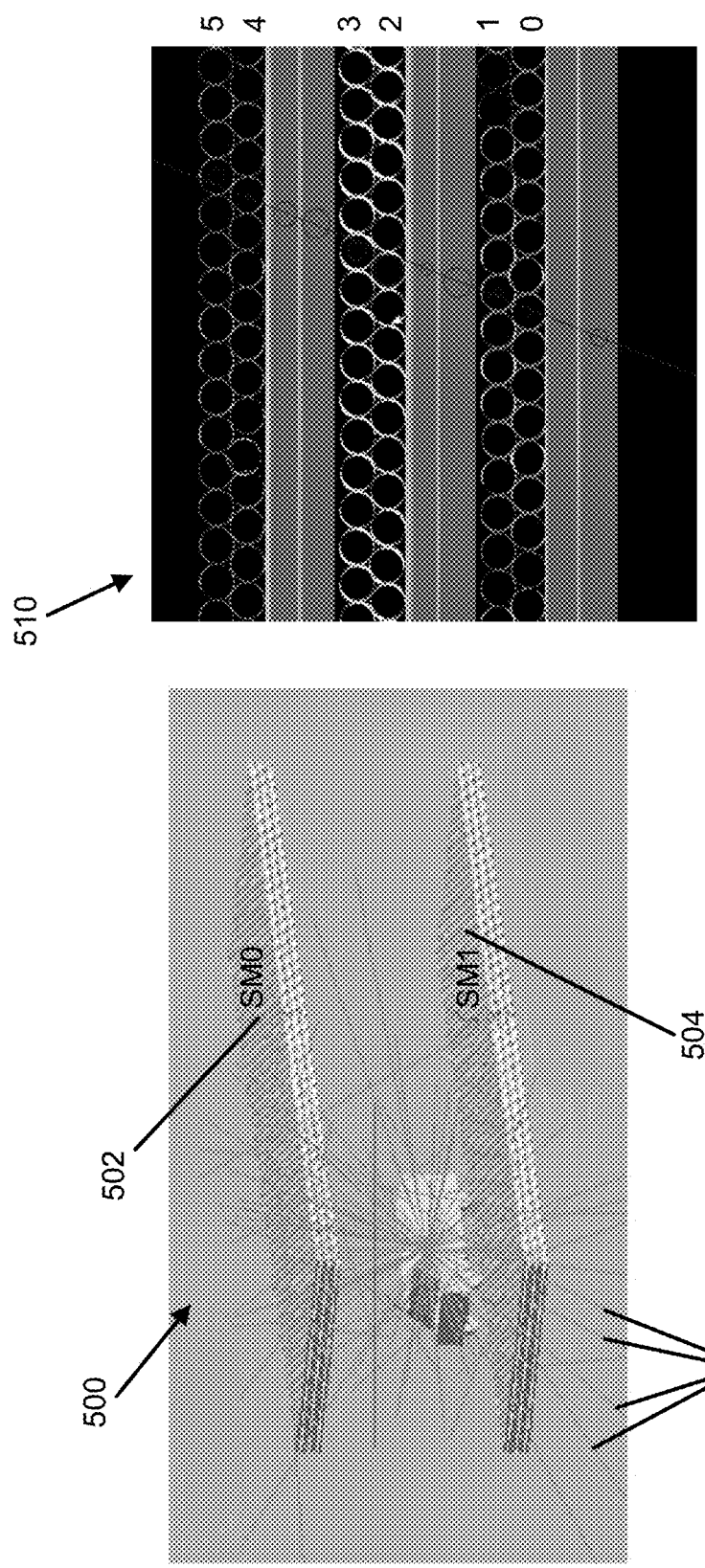
FIG. 5 illustrates an exemplary detector array showing a truck being positioned and scanned between two SMs (SM0 and SM1), each of which comprising three XY layers in accordance with some embodiments described herein.

Once the SM calibration is complete, the calibration of each module may be performed. In one embodiment, a module calibration process involves: (1) reading the offline data including a starting geometry of the module; (2) fitting the tracks and performing an iterative calibration procedure; and (3) modifying the geometry and storing the new geometry file. For example, FIG. 5 illustrates an exemplary detector array 500 comprising two SMs (SM0 (502) and SM1 (504)), each of which comprising three XY-layers. On the left of FIG. 5, which shows two SMs (SM0 and SM1), the green lines (506) intersecting the truck are reconstructed particle tracks. Only a few of the reconstructed particle tracks are labeled as 506 due to space restriction of the figure. A close-up view of part of a SM is shown on the right of FIG. 5. The close-up view 510 shows part of tubes that make up the three X and three Y layers (or three XY layers) of the SM. The six XY-layers are numbered sequentially as 0, 1, 2, 3, 4, 5, from bottom to top. Each X and Y layer comprises multiple modules. Each module is treated as a rigid body. In some implementations, each of the six layers is calibrated by first excluding the drift tubes in the given layer from participating in the determination of the particle tracks, then calculating and storing to a histogram of the residuals formed by the difference between the computed tracks and the excluded layer's measurements. The residuals for each module are stored in two histograms, one for each half of the length of the tubes. After a specified number of epochs have been processed, the horizontal position and angular rotation of each module is determined by fitting to the median of each histogram using the known length of the drift tubes. The generated straight line defines a horizontal translational shift and a horizontal rotation for each module. The process is repeated for each of the six modules.

Once the module calibration is complete, the calibration of drift tubes may be performed. During this level of calibration, each drift tube's location and orientation are determined in a procedure substantially similar to the module calibration procedure.

Once the drift tube calibration is complete, the calibration of drift tube segment may be performed. During this level of calibration, each drift tube segment is divided into two halves and residuals are put into one of two histograms. The two sets of histograms for each tube segment defines a straight line which enables extraction of a horizontal position shift and an angular rotation that minimizes the residuals in each histogram.

An exemplary high-level program code for executing a hierarchical calibration may include the following steps, wherein the entire sequence of steps may be repeated two or more times.

(1) For i=0, 1, 2, 3, 4, 5:
   a. Calibrate all modules in XY layer i in SM pair SM2/SM3 using enough epochs (e.g., 240) of data to ensure at least 20,000 residuals in each histogram (referring this epoch number as a "shorttime").

(2) For i=0, 1, 2, 3, 4, 5:
   a. Calibrate all modules in XY layer i in SM pair SM0/SM1 using shorttime epochs.

(3) For half in SM2/SM3 SM0/SM1:
   a. Calibrate drift tube halves using about 4 times longer than shorttime, in order to collect enough residuals for statistical robustness.

(4) For half in SM2/SM3 SM0/SM1:
   a. Calibrate drift tube section halves, where a drift tube section is half a drift tube, using about 4 times longer than shorttime.
(5) For i=0, 1, 2, 3, 4, 5:
   a. Calibrate all modules in XY layer i in whole scanner using shorttime;
   b. Calibrate drift tubes in whole scanner using about 4 times longer than shorttime;
   c. Calibrate drift tube sections in whole scanner using about 4 times longer than shorttime.

At the end of this procedure, the location and orientation of each of the 8,640 drift tubes (for a four-SM detector array) have been adjusted to minimize track errors.

Momentum Calibration

Calibrating the muon momentum for the detectors is important to enable accurate reconstructions of material properties (density and Z) and their spatial distributions within a VOI. This is because the expected scattering angle distribution of the detected muons depends on particle momentum. In some embodiments, to perform this calibration, flat plates of known material property, such as a chosen steel composition, and known thickness (typically four inches and one inch) are inserted in the VOI, parallel to the SMs within a detector array. The observed scattering from the plate is compared to the analytical expressions, which are based upon the Rossi formula (see the figure below and references therein). L1 fits to the particle trajectories yield a residual error. The calibrated momentum is proportional to the inverse of the median of the residual distribution. A combination of a spline for of a fourth-order polynomial in the inverse residual is used out to past 1.5 to 2 GeV where an inverse falloff is utilized.

The disclosed detector calibration technology has been demonstrated to improve detector performance by increasing detector efficiency. FIG. 6 is a table 600 showing the improvements from the detector calibration using the above-described modular calibration procedure on a "Freeport detector" in accordance with some embodiments described herein. For clarity, table 600 is reproduced below.

TABLE 600

| Geometry | Detector Efficiency (Tracks/S) | Geometry Mean Scattering Angle (mr) | Average Median Residual (cm) | Geometric Mean DoCA (cm) |
|---|---|---|---|---|
| Nominal | 6820 | 35.4 | 0.051 | 9.3 |
| Calibrated | 8507 | 11.7 | 0.031 | 1.4 |
| Percent Improvement | 25% | 199% | 65% | 564% |

As can be seen, when the detector array is calibrated, a greater fraction of the incident muon flux is successfully tracked through both top and bottom SM's (see the Tracks/s column in the table below). Likewise, track errors are substantially reduced, which include the mean scattering angle (in principle, zero), the mean residual track error in cm, and the mean DoCA (a measure of the mismatch in track projections between upper and lower SM's). This data, collected from a field-deployed and operational detector unambiguously demonstrates the efficacy of the proposed calibration technology.

The commercial application of this invention is in the calibration of subatomic particle detector arrays, primarily in counterterrorism, force and facility protection (the detection of certain types of contraband). Other applications of commercial interest may include calibration of detector arrays used in medical physics and nondestructive evaluation, such as monitoring of nuclear reactors.

Implementations of the subject matter and the functional operations described in this patent document can be implemented in various systems, digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a tangible and non-transitory computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of nonvolatile memory, media and memory devices, including by way of example semiconductor memory devices, e.g., EPROM, EEPROM, and flash memory devices. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A method for calibrating a modular charged particle detector array which includes one or more pairs of super modules, wherein one super module in a pair from the one or more pairs of super modules is positioned above a volume of interest (VOI), and the other super module in the pair is positioned below the VOI, the method comprising:
   calibrating individual super modules in the one or more pairs of super modules, wherein each super module in the one or more pairs of super modules includes multiple vertically-stacked modules, and wherein each module in the multiple vertically-stacked modules includes multiple layers of charged particle detectors from the modular charged particle detector array;
   calibrating individual modules in each of the super modules; and
   calibrating individual charged particle detectors in each layer of charged particle detectors in the modules.

2. The method of claim 1, wherein the charge particle detectors include drift tubes.

3. The method of claim 2, comprising:
   prior to calibrating individual super modules, identifying one super module as the reference super module among the one or more pairs of super modules, the reference super module is to provide the coordinate reference frame for the other super modules within the one or more pairs of super modules.

4. The method of claim 3, wherein identifying the reference super module includes:
   identifying a corner on the reference super module as the origin of the coordinate reference frame; and
   identifying an X-Y plane and a Z-axis of the reference super module as (X, Y, Z)-coordinates of the reference frame.

5. The method of claim 4, comprising:
   after identifying the reference super module and prior to calibrating the modular charged particle detector array, specifying degrees of freedom for each of the other super modules within the one or more pairs of super modules with respect to the coordinate reference frame.

6. The method of claim 5, wherein specifying the degrees of freedom for each of the other super modules includes:
   specifying positions of a given other super module based on a reference origin on the given other super module with respect to the origin of the reference frame; and
   specifying orientations of the other super module based on three Euler angles with respect to the (X, Y, Z)-coordinates of the reference frame.

7. The method of claim 5, wherein individual drift tubes comprise drift tube segments; and
   the method comprising:
   after identifying the reference super module and prior to calibrating the modular charged particle detector array, specifying nominal positions and orientations for:
   individual modules in each of the other super modules;
   individual drift tubes in each of the individual modules; and
   individual drift tube segments in each of the drift tubes in individual modules.

8. The method of claim 2, comprising:
   after calibrating the individual modules but prior to calibrating the individual drift tubes, calibrating individual layers of drift tubes in each of the modules in each of the super modules.

9. The method of claim 2, wherein individual drift tubes comprises drift tube segments; and the method comprising:
   after calibrating the individual drift tubes in each layer of drift tubes in each of the modules, calibrating drift tube segments in each of the individual drift tubes.

10. The method of claim 1, comprising:
    while calibrating individual super modules, treating each super module being calibrated as a rigid body.

11. The method of claim 1, wherein calibrating individual super modules includes:
    predicting new values of the positions and orientations of a given super module;
    computing differences between previous values of the positions and orientations and the predicted new values;
    generating updated values for the positions and orientations by updating the previous values by a fraction of the computed differences between the previous values and the predicted new values;
    using the updated values for the positions and orientations to determine one or more error parameters; and
    repeating the predicting, computing, generating and using until the determined one or more error parameters satisfies one or more predetermined thresholds.

12. The method of claim 11, wherein calibrating the super module further includes iterating to minimize the one or more error parameters.

13. The method of claim 12, wherein the one or more error parameters include:
    a scattering angle between a first charged particle track generated by the upper super module in a pair of super modules and a second charged particle track generated by the lower super module in the pair of super modules, wherein the first and the second charged particle tracks are generated by the same charged particle, and wherein a well-calibrated charged particle detector array is associated with a substantially zero scattering angle; and a distance of closest approach (DoCA) between the first charged particle track and second charged particle track, wherein a perfectly aligned charged particle detector array is associated with a substantially zero DoCA.

14. The method of claim 1, comprising:
while calibrating individual modules in each of the super modules, treating each module being calibrated as a rigid body.

15. The method of claim 1, wherein calibrating a module in the individual modules includes:
reading offline data including a starting geometry of the module;
performing an iterative calibration on the module based on charged particle track fitting; and
modifying the starting geometry and storing the modified geometry in a file.

16. The method of claim 1, wherein the VOI is an empty VOI.

* * * * *